United States Patent
Park et al.

(10) Patent No.: US 11,108,347 B2
(45) Date of Patent: Aug. 31, 2021

(54) MOTOR ROTOR CONTROLLING APPARATUS AND METHOD

(71) Applicant: Hanon Systems, Daejeon (KR)

(72) Inventors: Pureunsam Park, Daejeon (KR); Ho Bin Im, Daejeon (KR); Sang Hun Kim, Daejeon (KR); Won Seok Kim, Daejeon (KR); Tae Wan Kim, Daejeon (KR); Sung Joon Lee, Daejeon (KR)

(73) Assignee: Hanon Systems, Daejeon (KR)

( * ) Notice: Subject to any disclaimer, the term of this patent is extended or adjusted under 35 U.S.C. 154(b) by 190 days.

(21) Appl. No.: 16/323,188

(22) PCT Filed: Aug. 28, 2017

(86) PCT No.: PCT/KR2017/009391
§ 371 (c)(1),
(2) Date: Feb. 4, 2019

(87) PCT Pub. No.: WO2018/048129
PCT Pub. Date: Mar. 15, 2018

(65) Prior Publication Data
US 2021/0091690 A1 Mar. 25, 2021

(30) Foreign Application Priority Data

Sep. 9, 2016 (KR) .......................... 10-2016-0116605

(51) Int. Cl.
H02P 6/18 (2016.01)
H02P 6/20 (2016.01)

(52) U.S. Cl.
CPC . *H02P 6/18* (2013.01); *H02P 6/20* (2013.01)

(58) Field of Classification Search
CPC .................................... H02P 6/18; H02P 6/20
USPC ......................................... 318/798, 767, 727
See application file for complete search history.

(56) References Cited

U.S. PATENT DOCUMENTS

| | | | | |
|---|---|---|---|---|
| 5,854,548 A | * | 12/1998 | Taga | H02P 6/185 318/721 |
| 6,288,514 B1 | * | 9/2001 | Direnzo | H02P 25/089 318/701 |
| 8,994,306 B2 | * | 3/2015 | Kobayashi | H02P 6/185 318/400.33 |

(Continued)

FOREIGN PATENT DOCUMENTS

| | | |
|---|---|---|
| EP | 2840702 A2 | 2/2015 |
| JP | 2008228468 A | 9/2008 |
| KR | 20010100648 A | 11/2001 |

(Continued)

*Primary Examiner* — David Luo
(74) *Attorney, Agent, or Firm* — Norton Rose Fulbright US LLP; James R. Crawford

(57) ABSTRACT

The present disclosure relates to a motor rotor control device and method capable of reducing noise caused by the alignment of a motor rotor, and securing stability of staring a motor. The motor rotor control device in accordance with an embodiment of the present disclosure includes a motor having a rotor; an inverter for supplying a three-phase alternating-current voltage to the motor; and a control unit for estimating the initial location of the rotor upon the initial driving of the motor, correcting the location of the rotor by a predetermined angle from the estimated initial location, and then driving the motor.

10 Claims, 7 Drawing Sheets

(56) References Cited

U.S. PATENT DOCUMENTS

2013/0342145 A1   12/2013   Kobayashi et al.

FOREIGN PATENT DOCUMENTS

| KR | 20110086892 A | 8/2011 |
| KR | 20160056622 A | 5/2016 |

* cited by examiner (a)

(b)

(a)

(b)

MOTOR ROTOR CONTROLLING APPARATUS AND METHOD

This application is a national phase under 35 U.S.C. § 371 of International Application No. PCT/KR2017/009391 filed Aug. 28, 2017, which claims the benefit of priority to Korean Patent Application No. 10-2016-0116605 filed on Sep. 9, 2016. The entire contents of these applications are incorporated herein by reference in their entirety.

TECHNICAL FIELD

The present disclosure relates to a motor rotor control method and device, and more particularly, to a motor rotor control device and method capable of reducing noise caused by the alignment of a motor rotor, and securing stability of starting a motor.

BACKGROUND ART

Location information of a rotor is required to drive a motor. In order to obtain the location information of this rotor, a sensor such as a Hall sensor, an encoder, or a resolver is mainly used. Since a motor for driving a voltage compressor is difficult to mount a location sensor, it estimates the location of the rotor using a sensorless algorithm. These sensorless algorithms obtain the location information of the rotor using a counter electromotive force generated when the motor rotates. Accordingly, when the motor is stopped, there is a disadvantage in that no counter electromotive force is generated and the location of the rotor cannot be known. Accordingly, the sensorless algorithm performs a driving control of the motor in the order of ① rotor alignment ->forced drive -> sensorless control.

There is a problem in that when malfunction of the logic for estimating or detecting the initial location of the motor occurs, the starting is performed at the inaccurate location of the rotor, which causes unstable fluctuation of a current and vibration at the start of the motor.

In order to improve such a problem, a method for aligning the rotor by estimating the location of the stationary rotor instead of a predetermined alignment location has been proposed. In this time, a fine voltage is applied to estimate the location of the rotor in the stationary state, and the location of the rotor is estimated by using the response to the current.

There are disadvantages in that it is not possible to distinguish the N pole and S pole of a magnet even if the initial location of the rotor is estimated, and an additional high voltage should be applied to distinguish the N pole and S pole of the magnet. That is, although it is possible to estimate the initial location of the rotor, there is a limitation that the N pole and S pole thereof cannot be accurately distinguished. There are problems in that when the estimation error of the N pole and S pole thereof occurs, the location error of 180 [deg] level electrically occurs, and unstable fluctuation of a large current and physical vibration and noise occur during the alignment of the rotor.

DISCLOSURE

Technical Problem

An object of the present disclosure for solving the above problems is to provide a motor rotor control device and method capable of reducing noise caused by the alignment of a motor rotor, and ensuring stability of starting a motor.

Another object of the present disclosure for solving the above problems is to provide a motor rotor control device and method for aligning the rotor from the estimated location to +90 [deg] or 90 [deg] considering an error in the initial location estimation of the motor rotor.

Technical Solution

A motor rotor control device in accordance with an embodiment of the present disclosure for achieving the objects includes a motor having a rotor; an inverter for supplying a three-phase alternating-current voltage to the motor; and a control unit for estimating the initial location of the rotor upon the initial driving of the motor, correcting the location of the rotor by a predetermined angle from the estimated initial location, and then driving the motor.

In addition, the control unit aligns the location of the rotor from the estimated location to +90 [deg] or 90 [deg] considering an error in the initial location estimation of the rotor.

In addition, the control unit supplies a fine current to the motor through the inverter, and estimates the initial location of the rotor by detecting the response to the fine current.

In addition, the control unit determines the alignment location of the rotor based on an initial location value of the motor rotor, and supplies a control signal to the inverter so that the rotor is located at the determined alignment location.

In addition, the control unit controls the alignment location of the rotor by controlling the magnitude of the current supplied to the rotation shaft of the motor during the time reaching a predetermined magnitude of the current.

A motor rotor control method in accordance with an embodiment of the present disclosure for achieving the objects includes estimating the initial location of a motor rotor upon the initial driving of a motor; correcting the location of the rotor by a predetermined angle from the initial location of the rotor; and accelerating the motor after aligning the rotor.

In addition, the motor rotor control method in accordance with an embodiment of the present disclosure aligns the location of the rotor from the estimated location to +90 [deg] or 90 [deg] considering an error in the initial location estimation of the rotor.

In addition, the motor rotor control method in accordance with an embodiment of the present disclosure supplies a fine current to the motor, and estimates the initial location of the rotor by detecting the response to the fine current.

In addition, the motor rotor control method in accordance with an embodiment of the present disclosure determines the alignment location of the rotor based on an initial location value of the motor rotor, and supplies a control signal to an inverter so that the rotor is located at the determined alignment location.

In addition, the motor rotor control method in accordance with an embodiment of the present disclosure controls the alignment location of the rotor by controlling the magnitude of a current supplied to the rotation shaft of the motor during the time reaching a predetermined magnitude of the current.

Advantageous Effects

The motor rotor control device and method in accordance with an embodiment of the present disclosure can reduce noise caused by the alignment of the rotor by aligning the rotor from the estimated location to +90 [deg] or 90 [deg]

considering the error in the initial location estimation of the motor rotor, and secure the stability of starting the motor.

DISCLOSURE OF INVENTION

Figure 1:
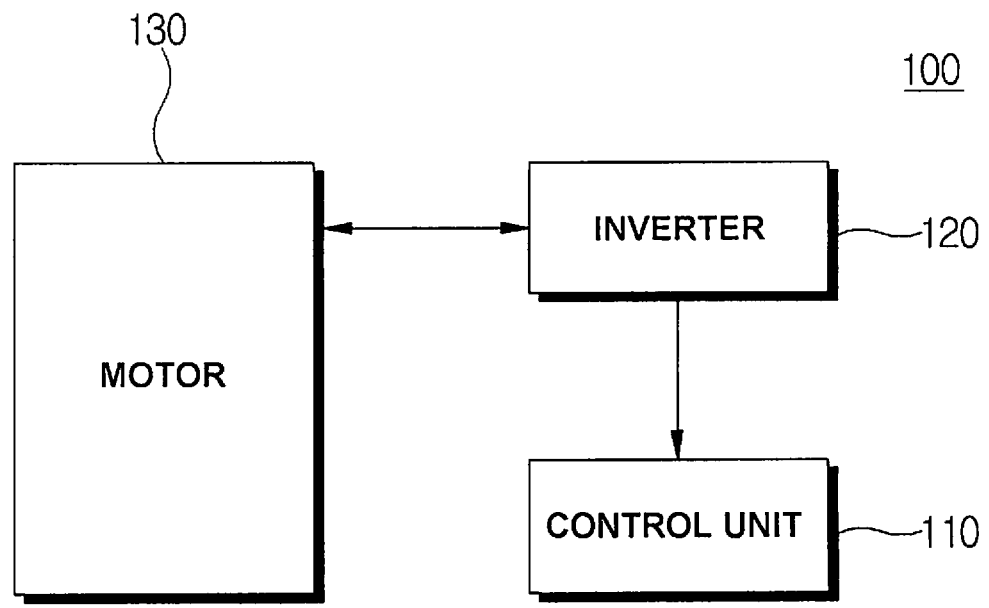
FIG. 1 is a block diagram illustrating a main configuration of a motor rotor control device in accordance with an embodiment of the present disclosure.

Hereinafter, exemplary embodiments of the present disclosure will be described in detail with reference to the accompanying drawings so that those skilled in the art to which the present disclosure pertains can easily practice the present disclosure. The present disclosure can be implemented in various different forms, and is not limited to the exemplary embodiments described herein.

Descriptions of irrelevant components are omitted from the drawings so as to clearly describe the present disclosure, and throughout this specification, the same or like elements are denoted by the same reference numerals.

Throughout this specification, when an element is referred to as being "connected" to another element, it can be "directly connected" to the other element or "electrically connected" to the other element with other elements interposed therebetween. In addition, it means that when an element is referred to as "comprises" another element, the element is intended not to exclude other elements, but to further include other elements, unless the context specially indicates otherwise.

When it is described that any part is "on" the other part, the part can be directly on the other part or the other part can be interposed therebetween. On the contrary, when it is described that any part is "directly on" the other part, there is no other part interposed therebetween.

The terms "first," "second," "third" and the like are used to illustrate various parts, components, areas, layers and/or sections, but are not limited thereto. These terms are only used to differentiate a certain part, component, area, layer or section from other part, component, area, layer or section. Accordingly, a first part, component, area, layer or section, which will be mentioned hereinafter, can be referred to as a second part, component, area, layer or section without departing from the scope of the present disclosure.

The terminology used herein is for the purpose of describing particular embodiments only and is not intended to limit the present disclosure. As used herein, the singular forms are intended to include the plural forms as well, unless the context clearly indicates otherwise. It will be further understood that the terms "comprises" when used in this specification, specify the presence of stated features, regions, integers, steps, operations, elements, and/or components, but do not preclude the presence or addition of other features, regions, integers, steps, operations, elements, and/or components.

Terms "below", "above", and the like indicating a relative space can be used to more easily describe a relationship between one part illustrated in the drawings with another part. These terms are intended to include other meanings or operations of a device that is being used, in addition to meanings intended in the drawings. For example, when the device in the drawing is inverted, any parts described as being "below" other parts can be described as being "above" the other parts. Accordingly, the exemplary term "below" includes both of an upper direction and a lower direction. The device can rotate by 90° or other angles, and the terms indicating a relative space are interpreted according thereto.

Unless otherwise defined, all terms including technical and scientific terms used herein have the same meaning as commonly understood by those skilled in the art to which the present disclosure pertains. Terms, such as those defined in commonly used dictionaries, should be additionally interpreted as having a meaning that is consistent with their meaning in the context of the relevant art and/or the present disclosure, and will not be interpreted in an idealized or overly formal sense unless expressly so defined herein.

Hereinafter, exemplary embodiments of the present disclosure will be described in detail with reference to the accompanying drawings so that those skilled in the art to which the present disclosure pertains can easily practice the present disclosure. However, the present disclosure can be implemented in various different forms, and is not limited to the exemplary embodiments described herein.

Figure 2:
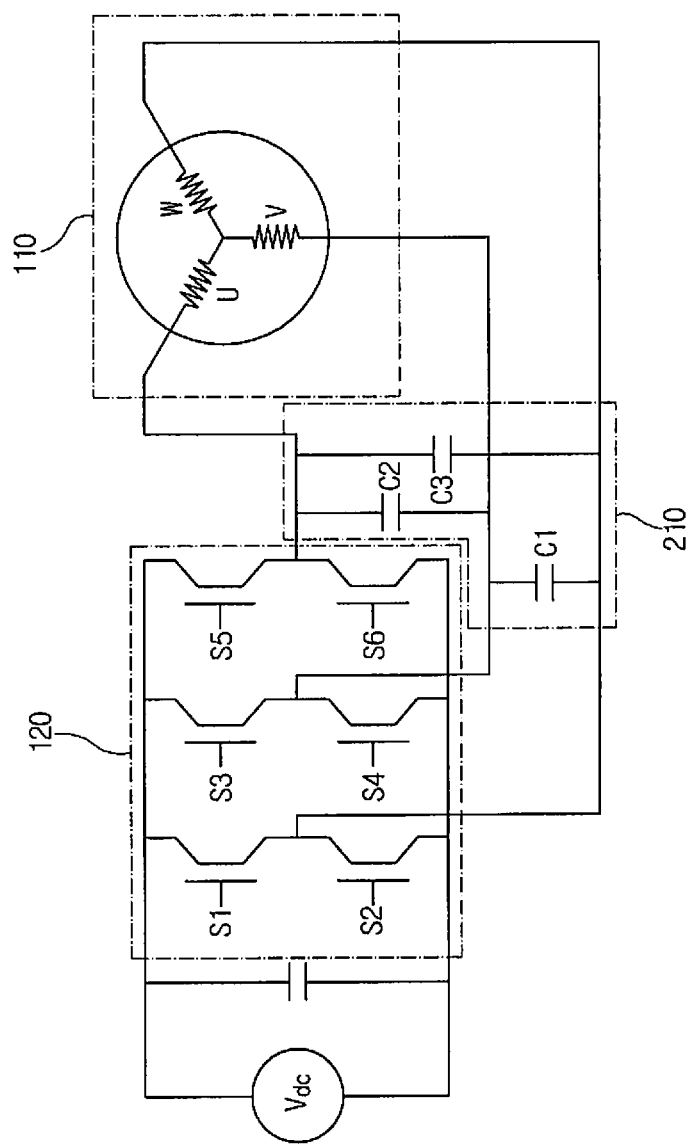
FIG. 2 is a diagram illustrating an example of an inverter composed of a three-phase switching element in accordance with an embodiment of the present disclosure.

FIG. 1 is a block diagram illustrating a main configuration of a motor rotor control device in accordance with an embodiment of the present disclosure, and FIG. 2 is a diagram illustrating an example of an inverter composed of a three-phase switching element in accordance with an embodiment of the present disclosure.

Referring to FIGS. 1 and 2, a motor rotor control device 100 in accordance with the present disclosure includes a motor 110, an inverter 120, and a control unit 130.

The motor 110 (e.g., the BLDC motor) includes a rotor, and receives power from the inverter 120 to rotate the rotor to provide a rotational force. Herein, the motor 110 includes the winding having a three-phase coil for generating inductance component. That is, the motor 110 has no insulation conductor such as a carbon brush for delivering power, and has a magnet on a motor shaft and a coil located on the inner wall surface of a motor case. Rotation can be performed without the brush by supplying power for rotation to the coil attached to the inner wall of the motor that does not rotate.

The inverter 120 converts a direct-current voltage into a three-phase alternating-current voltage to supply it to the motor 110. In this time, the inverter 120 has each of power switching elements S1 to S6 connected to the windings of three phases U, V, W. That is, the inverter 120 can include a three-phase switching element, for example, an upper three-phase Field Effect Transistor (FET) and a lower three-phase FET.

The control unit 130 estimates the initial location of the rotor upon the initial driving of the motor 110 and corrects the location of the rotor by a predetermined angle from the estimated location. Then, the motor 110 is driven to accelerate at a predetermined speed. In this time, the control unit 130 controls the inverter 120 so that the rotor of the motor 110 rotates in a predetermined alignment direction (normal rotation or reverse rotation).

In addition, when the motor 110 is stopped, the control unit 130 controls the operation of the motor 110 through the procedures of aligning the rotor to a predetermined specific location, forcibly driving the motor by generating a rotating magnetic field in the motor in which the rotor has been aligned, and controlling the motor with sensorless by acquiring the location information of the rotor using a counter electromotive force when the counter electromotive force is generated in the forcibly driven motor.

When the rotor rotates in the alignment direction by applying a current for alignment to the motor 110 through the inverter 120, the control unit 130 controls the RPM of the motor rotor to be reduced to stop the rotor at the alignment location.

The inverter 120 in accordance with the present disclosure has each of the power switching element FETs S1 to S6 connected to the winding of the three phases U, V, W. In this time, a power factor correction capacitor 210 can be connected in parallel to a connection line between the inverter 120 and the three-phase winding of the motor 110, respectively. That is, three capacitors in the power factor correction capacitor 210 can be connected in parallel between the U phase and V phase, between the V phase and the W phase, and between the W phase and the U phase in the three phases that are present at the output terminal of the inverter 120, respectively. Then, the magnitude of the capacitance of the power factor correction capacitor 210 can be set to be kept the same as the magnitude of the inductance component of the motor 110.

The control unit 130 applies a switching driving signal of each of the power switching elements S1 to S6 to the inverter 120. That is, the control unit 130 controls the starting, operation, and speed of the motor 110 by controlling the switching operation of each of the switching elements S1 to S6 in the inverter 120 according to a user operation, and generates the switching driving signal for switching each of the switching elements S1 to S6 to apply it to the inverter 120.

Figure 3:
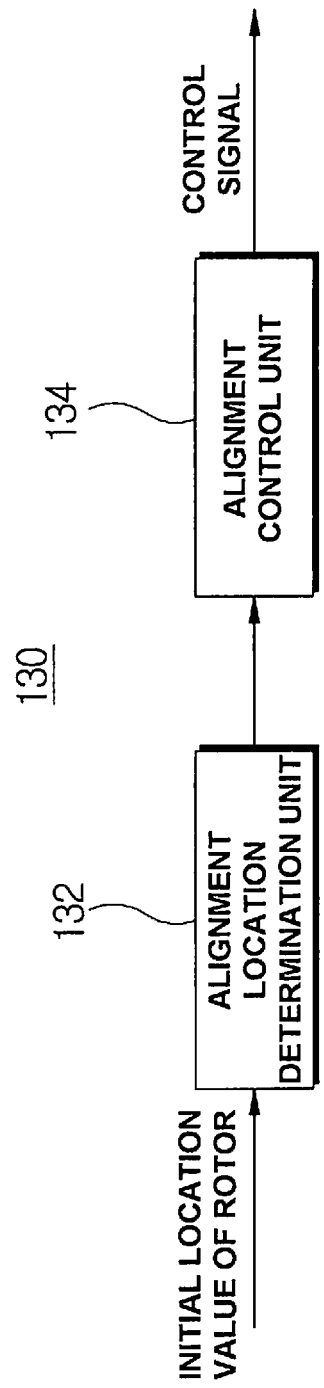
FIG. 3 is a diagram illustrating a control unit in accordance with an embodiment of the present disclosure.

FIG. 3 is a block diagram of the control unit in accordance with an embodiment of the present disclosure.

Referring to FIG. 3, the control unit 130 in accordance with an embodiment of the present disclosure includes an alignment location determination unit 132 and an alignment control unit 134.

The control unit 130 supplies a fine current to the motor 110 through the inverter 120, and estimates the initial location of the rotor by detecting the response to the fine current. In this time, the locations of the S pole and N pole of the motor rotor are estimated, and an initial location value of the motor rotor is generated.

The alignment location control unit 132 determines the alignment location of the rotor based on the input initial location value of the motor rotor. In this time, the alignment location is determined from the estimated location to the location that becomes +90 [deg] or 90 [deg].

The alignment control unit 134 generates a control signal for locating the rotor at the determined alignment location, and supplies the generated control signal to the inverter 120 to rotate the rotor to locate it at the determined alignment location. In this time, the alignment control unit 134 controls the alignment location of the rotor by controlling the magnitude of the current supplied to the rotation shaft during the time reaching a predetermined magnitude of the current.

Then, the control unit 130 drives a motor-driven compressor of the vehicle by accelerating the motor rotor at a predetermined speed. At the same time, the speed of the motor rotor is controlled at a predetermined RPM.

Figure 4:
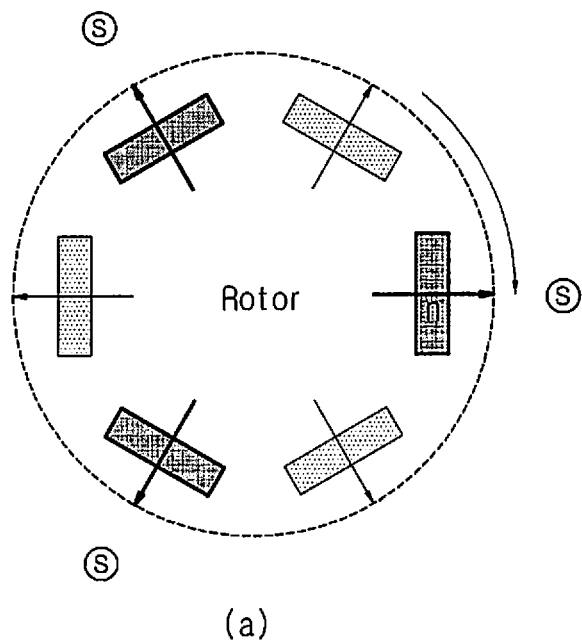
FIG. 4 is a diagram for explaining that physical vibration and noise caused by the location estimation error of a rotor occur, and unstable fluctuation of a current occurs at the start of the motor.
Figure 4:
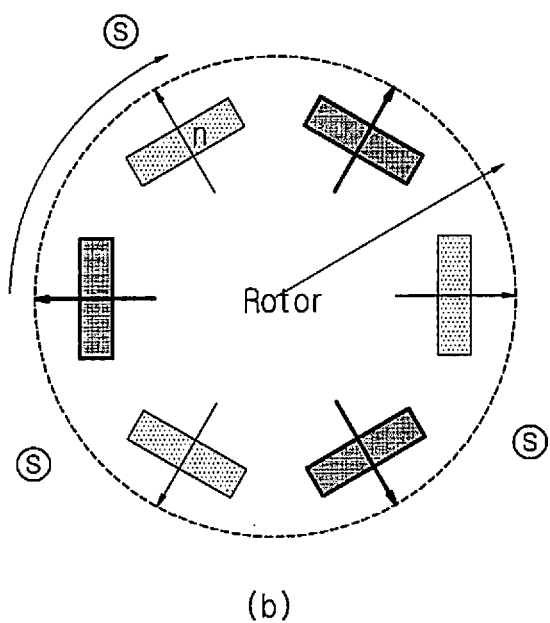

FIG. 4 is a diagram for explaining that physical vibration and noise caused by the location estimation error of the rotor occur, and unstable fluctuation of a current occurs at the start of the motor.

Referring to FIG. 4(*a*), unstable fluctuation of a current and physical vibration/noise during the alignment of the rotor are caused by a difference between the location when the motor rotor is stopped and a predetermined alignment location in a sensorless system.

Referring to FIG. 4(*b*), an initial location estimation algorithm cannot distinguish the N pole and S pole of the rotor, such that when the polarity estimation error occurs, the location error of 180 [deg] level electrically occurs during the alignment of the rotor. This causes unstable fluctuation of a large current and physical vibration and noise during the alignment.

In order to solve the problems, the motor rotor control device and method in accordance with an embodiment of the present disclosure can align the rotor from the estimated location to +90 [deg] or 90 [deg] considering the error in the initial location estimation of the motor rotor, thus reducing noise caused by the alignment of the rotor, and securing the stability of starting the motor.

Figure 5:
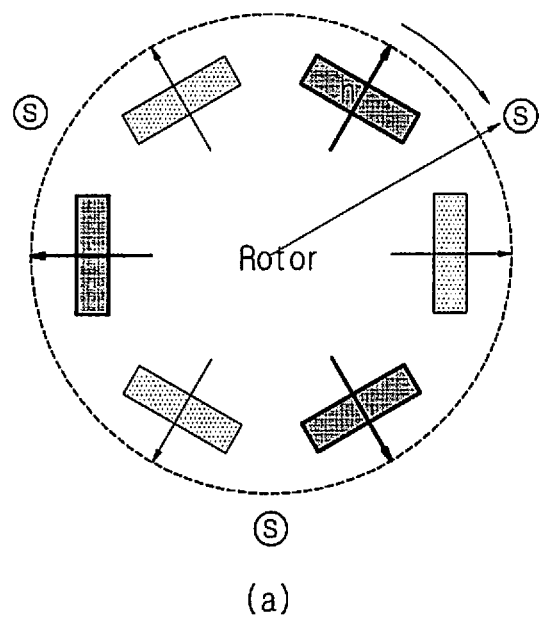
FIG. 5 is a diagram illustrating aligning the rotor from the estimated location to +90 [deg] or 90 [deg] considering an error in the initial location estimation of the motor rotor.
Figure 5:
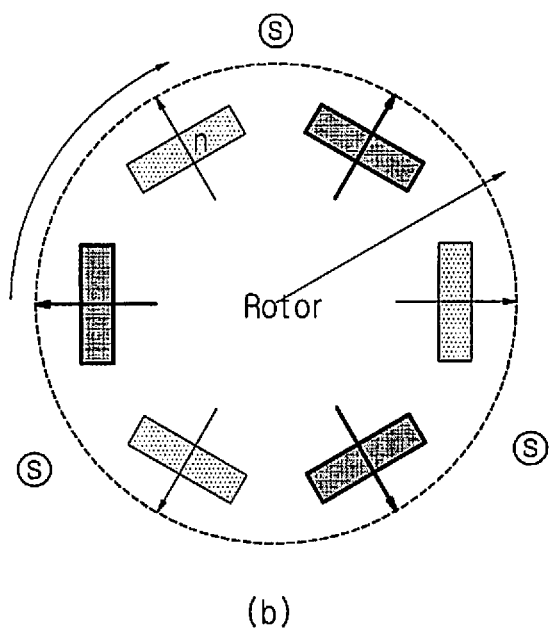

FIG. 5 is a diagram illustrating aligning the rotor from the estimated location to +90 [deg] or 90 [deg] considering the error in the initial location estimation of the motor rotor.

Referring to FIG. 5, the location of the N pole of the rotor can be accurately estimated initially through the location estimation logic of the rotor, and the location of the N pole can be erroneously estimated as the S pole.

When the rotor is aligned to the electrical location of +90 [deg] or 90 [deg] from the result of the electrode estimation of the rotor, the movement of the rotor corresponding to a constant electrical 90 [deg] during the alignment can be obtained.

That is, the location of the N pole and S pole of the rotor cannot be accurately estimated, such that in order to improve the problems of vibration, noise, and instability of starting caused by the estimation error of 180 [deg] in the initial location estimation, the location estimation error of the rotor has been reduced to 90 [deg] level.

As described above, when the location of the motor rotor is aligned, the movement corresponding to the constant electrical 90 [deg] is constantly appeared during the alignment regardless of the error in the initial location estimation of the motor rotor when the motor-driven compressor is started. As a result, it is possible to guarantee the constant level of error at all times, thus reducing the instability of a large current and the occurrence of vibration and noise during the alignment and ensuring stable starting.

Figure 6:
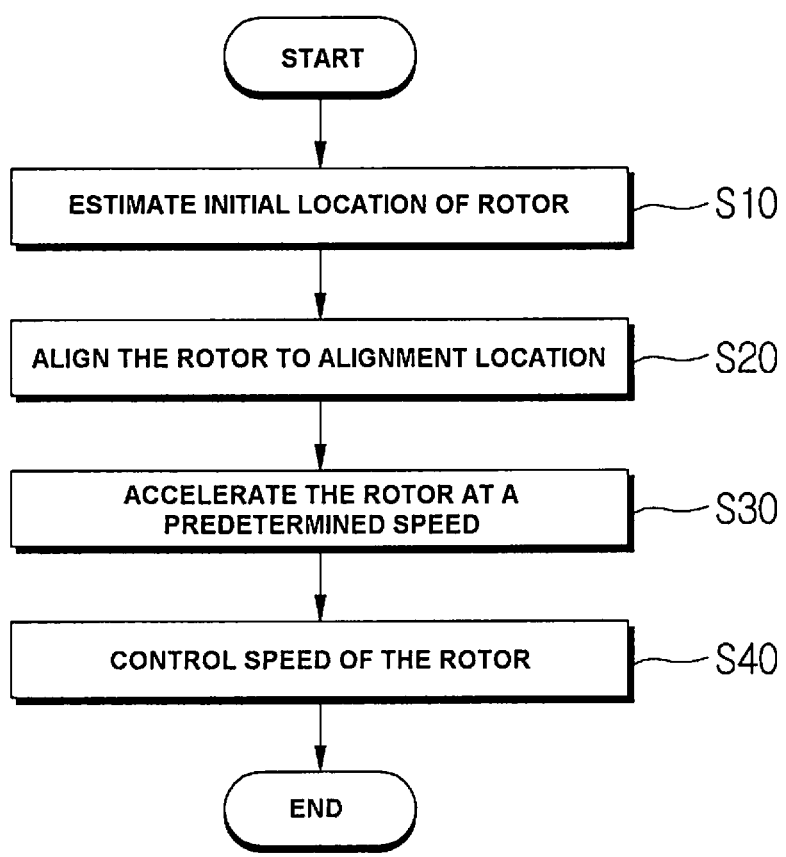
FIG. 6 is a diagram illustrating a motor rotor control method in accordance with an embodiment of the present disclosure.

FIG. 6 is a diagram illustrating a motor rotor control method in accordance with an embodiment of the present disclosure.

Referring to FIG. 6, a fine current is supplied to the motor 110, and the initial location of the motor rotor is estimated by detecting the response to the fine current S10. In this time, the locations of the S pole and N pole of the motor rotor are estimated, and an initial location value of the motor rotor is generated.

Then, the alignment location of the rotor is determined based on the initial location value of the motor rotor. In this time, the alignment location is determined from the estimated location to a location that becomes +90 [deg] or 90

[deg]. Then, a control signal for locating the rotor at the determined alignment location is generated, and the generated control signal is supplied to the inverter 120 to rotate the rotor to locate it at the determined alignment location S20. In this time, the magnitude of the current supplied to the rotation shaft of the determined alignment location is controlled while reaching a predetermined magnitude of the current for a predetermined time to control the alignment location of the rotor.

Then, the control unit 130 drives the motor-driven compressor of a vehicle by accelerating the rotor of the motor 110 at a predetermined speed S30.

Then, the control unit 130 controls the speed of the motor rotor at a predetermined RPM S40.

Figure 7:
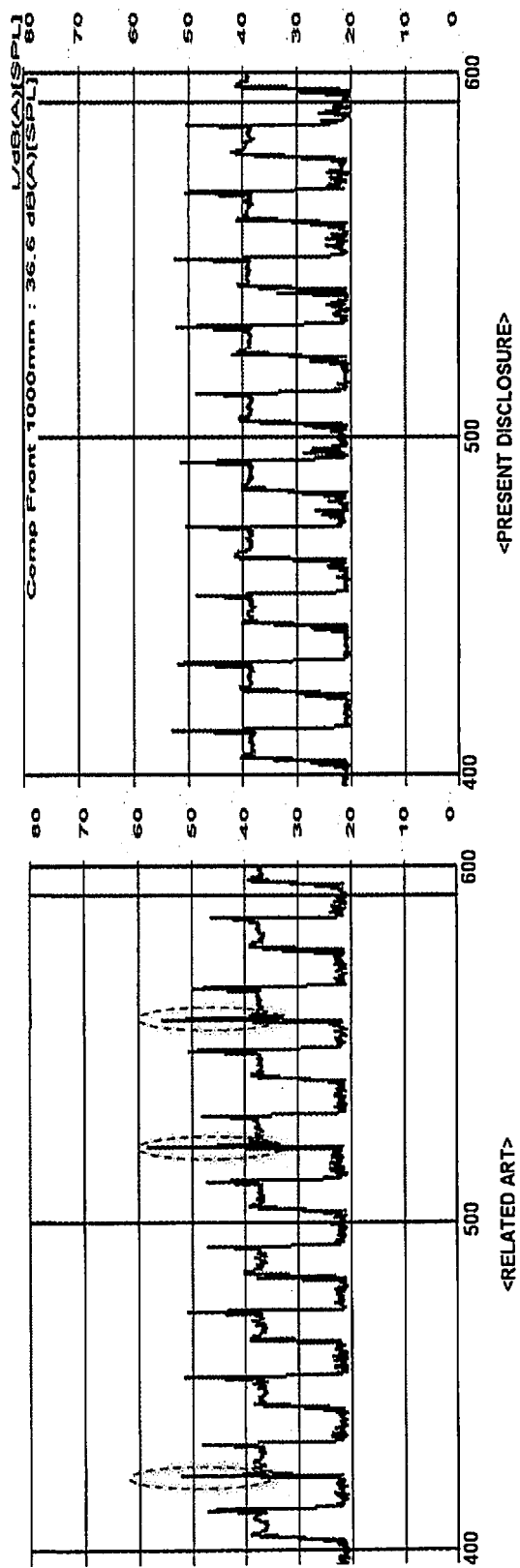
FIG. 7 is a diagram illustrating the effect of reducing the vibration and noise of the motor by the motor rotor control device and method in accordance with an embodiment of the present disclosure.

FIG. 7 is a diagram illustrating the effect of reducing the vibration and noise of the motor by the motor rotor control device and method in accordance with an embodiment of the present disclosure.

Referring to FIG. 7, an NVH test has been performed on the noise reduction effect occurred during the alignment of the motor rotor at the start of the motor-driven compressor, and the test results are illustrated in FIG. 7. The results of performing noise level evaluation in accordance with the related art and application of the present disclosure in the acoustic evaluation laboratory of the motor-driven compressor have been compared and illustrated in FIG. 7. The occurrence of noise has been evaluated under the test conditions that repeat On/Off for 10 seconds with Pd/Ps 14 barG/2 barG at 1000 rpm that is the RPM of the motor.

As illustrated in FIG. 7, in the related art, a large noise of 50 dBA or more has been continuously caused by the error in the initial location estimation of the motor rotor, but it can be confirmed that when applying the present disclosure, the noise of 50 dBA or more has been largely reduced regardless of the error in the initial location estimation of the motor rotor. Since the noise and vibration of the motor are proportional to each other, it can be confirmed that the vibration caused by the error in the initial location estimation of the motor rotor has been also reduced through the noise test result.

Those skilled in the art to which the present disclosure pertains will understand that the present disclosure can be implemented in other various forms without departing from the technical spirit or essential characteristics of the present disclosure, so the aforementioned embodiments should not be construed as being limitative, but should be construed as being only illustrative from all aspects. The scope of the present disclosure is disclosed in the appended claims rather than the detailed description, and it should be understood that all modifications or variations derived from the meanings and scope of the present disclosure and equivalents thereof are included in the scope of the appended claims.

The invention claimed is:

1. A motor rotor control device, comprising:
a motor having a rotor;
an inverter for supplying a three-phase alternating-current voltage to the motor; and
a rotor control device for estimating the initial location of the rotor upon the initial driving of the motor, aligning the rotor by rotating the rotor a predetermined angle from the estimated initial location; and
accelerating the aligned rotor to a specified speed to drive the motor.

2. The motor rotor control device of claim 1,
wherein the control unit aligns the location of the rotor from the estimated location to +90[deg] or 90[deg] considering an error in the initial location estimation of the rotor.

3. The motor rotor control device of claim 2,
wherein the control unit supplies a fine current to the motor through the inverter, and estimates the initial location of the rotor by detecting the response to the fine current.

4. The motor rotor control device of claim 2,
wherein the control unit determines the alignment location of the rotor based on an initial location value of the motor rotor, and supplies a control signal to the inverter so that the rotor is located at the determined alignment location.

5. The motor rotor control device of claim 4,
wherein the control unit controls the alignment location of the rotor by controlling the magnitude of the current supplied to the rotation shaft of the motor during the time reaching a predetermined magnitude of the current.

6. A motor rotor control method, comprising:
estimating the initial location of a motor rotor upon the initial driving of a motor;
aligning the rotor by rotating the rotor by a predetermined angle from the initial location of the rotor; and
accelerating the aligned rotor to a specified speed to drive the motor after aligning the rotor.

7. The motor rotor control method of claim 6,
wherein the location of the rotor is aligned from the estimated location to +90[deg] or 90[deg] considering an error in the initial location estimation of the rotor.

8. The motor rotor control method of claim 6,
wherein a fine current is supplied to the motor, and the initial location of the rotor is estimated by detecting the response to the fine current.

9. The motor rotor control method of claim 6,
wherein the alignment location of the rotor is determined based on an initial location value of the motor rotor, and a control signal is supplied to an inverter so that the rotor is located at the determined alignment location.

10. The motor rotor control method of claim 9,
wherein the magnitude of a current supplied to the rotation shaft of the motor during the time reaching a predetermined magnitude of the current is controlled to control the alignment location of the rotor.

* * * * *